US007478597B2

(12) United States Patent
Schroeder et al.

(10) Patent No.: US 7,478,597 B2
(45) Date of Patent: Jan. 20, 2009

(54) MULTI-AXIS GANTRY SYSTEM

(75) Inventors: Robert Schroeder, Machesney Park, IL (US); Glen Michalske, Stony Brook, NY (US)

(73) Assignee: Pacific Bearing Company, Rockford, IL (US)

( * ) Notice: Subject to any disclaimer, the term of this patent is extended or adjusted under 35 U.S.C. 154(b) by 131 days.

(21) Appl. No.: 11/545,006

(22) Filed: Oct. 6, 2006

(65) Prior Publication Data

US 2008/0083689 A1 Apr. 10, 2008

(51) Int. Cl.
*G02B 5/00* (2006.01)

(52) U.S. Cl. ..................... 104/137; 104/172.1; 33/1 M; 212/312; 212/316

(58) Field of Classification Search ................... 104/48, 104/50, 112, 173.1, 178, 179, 127, 128, 129, 104/137, 307; 212/312, 313, 314, 315, 316, 212/320, 321, 322, 71, 73, 74, 324; 33/1 M
See application file for complete search history.

(56) References Cited

U.S. PATENT DOCUMENTS 4,284,010 A * 8/1981 Marshall ..................... 104/292
4,527,119 A * 7/1985 Rogers et al. ............... 324/758
4,707,930 A * 11/1987 Sugiura et al. ................ 33/623
5,476,358 A * 12/1995 Costa ...................... 414/749.1

OTHER PUBLICATIONS

IBM Technical Disclosure Bulletin, NN9202455, Feb. 1992, vol. 34, issue 9 (abstract page and 1 drawing page).*

Techno Inc. Linear Motion Systems; Blueline Belt Drive XY Table; internet reference; printed Jun. 20, 2006; 2 pages; www.techno-isel.com.

GlobalSpec; 2 Axis Belt Drive Vertical Gantry; internet reference; printed Jun. 20, 2006; 1 page; www.globalspec.com.

Nook Industries; Modular Linear Actuator ELZU 30, 40, 60, 80, 80S; internet catalog pp. 52 and 53; 2 pages; http://www.precisionactuator.com/assets/pdf/NookActuatorELZU.pdf.

Yamaha Motor; Arm Type Cable Carrier FXYBx 2axis/IO; internet reference; 1 page; http://www.yamaha-motor.co.jp/global/industrial/robot/xyx/arm/0009.html.

Zach Radding Homebrew Laser Cutter; Instructables Step-by-Step Collaboration; internet reference; printed Jun. 20, 2006; 14 pages; www.instructables.com.

Emission Technologies; CNC Laser Cutter Kit; Assembly/Operation Instructions for Model# ETI-XYR Raster/Vector; 69 pages; http://www.emissiontechnologies.com/xy.htm.

* cited by examiner

*Primary Examiner*—Mark T Le
(74) *Attorney, Agent, or Firm*—Reinhart Boerner Van Deuren P.C.

(57) ABSTRACT

A multiple axis gantry for providing movement along multiple axis is provided. The multiple axis gantry includes a pair of horizontal tracks and a vertical track to which a work piece carriage is attached. One drive motor provides an input for horizontal movement of the vertical track and a second drive motor provides an input for vertical movement of the work piece carriage. The vertical track of the gantry is driven proximate both ends to prevent cocking or binding during horizontal movement. Furthermore, the multiple axis gantry is configured such that manufacture of a gantry having custom dimensions for the horizontal tracks and vertical track is simple and cost effective.

20 Claims, 7 Drawing Sheets

MULTI-AXIS GANTRY SYSTEM

FIELD OF THE INVENTION

This invention generally relates to gantries and more particularly to gantries having multiple axes.

BACKGROUND OF THE INVENTION

Gantries, including multiple axis gantries, are generally known in the art. Multiple axis gantries are used to position work devices attached to a work piece carriage of the gantry. The gantries include tracks or guides along which the work piece carriage moves by means of electric motors or other input devices along the various axes to most accurately position the working device. Gantries have been used for moving items from one location to another including gantry cranes for lifting containers off of barges, moving work pieces throughout factories, and selecting individual components from predetermined locations as well as in devices operating while in continuous motion CNC machines, pen plotters, laser cutters and the like.

To position the work piece carriage, one type of multiple axis gantry, for lighter duty applications, includes linear actuators incorporating lead screws or ball screws driven by electric motors such as the Macron Dual Rail X-Y System commercially available from Macron Dynamics, Inc. of Horsham, Pa. Typically, a first linear actuator moves a second linear actuator mounted in transverse relation to a movable carriage of the first linear actuator. The second linear actuator includes and positions a second carriage that functions as the work piece carriage. With the second linear actuator aligned transverse to the first linear actuator, the gantry provides two axes of travel along which the work piece carriage may be positioned. Unfortunately, if the work piece carriage is moved to an end of the second linear actuator, offset loading can occur and create large torques on the first linear actuator requiring the structure of the first and second linear actuators to be extremely strong and rigid, which can make the gantry large and bulky, costly as well as difficult to manufacture in custom sizes. To rectify the problem associated with offset loading, other types of multiple axis gantries include a pair of linear actuators positioned proximate the ends of second linear actuator to prevent the previously discussed offset loading and resulting torques.

Alternative linear actuators incorporate belt driven carriages such as the ELZU MODULAR Linear Actuator commercially available from Nook Industries of Cleveland, Ohio. The linear actuators incorporate endless belts driven by drive motors that actuate the work piece carriage or the other linear actuators. Unfortunately, the use of belt driven linear actuators can further the difficulty and cost of manufacturing custom sized multiple axis gantries. Custom size gantries require custom length drive belts, and manufacture of infinite sizes of belts can be very costly and impractical.

There exists, therefore, a need in the art for a multiple axis gantry that is configured and manufactured such that it can be easily and inexpensively manufactured as well as easily and cost effectively manufactured in custom sizes.

BRIEF SUMMARY OF THE INVENTION

The present invention is directed toward simplified multi-axis gantries that is configured to incorporate guide tracks and drive belts that are easily and cost effectively manufactured and configured to custom lengths for custom sized multi-axis gantries. The guide tracks may be provided by simple sheet metal machining processes as well as by extruding and then merely cutting the guide tracks to the desired lengths. Furthermore, in an embodiment, the drive belts may be cut to length and are not required to be endless loops such that any length of belt may be readily and easily manufactured. Furthermore, the configuration of embodiments of multi-axis gantries in accordance with the teachings of the present invention can be easily calibrated by merely releasing clamps that secure the drive belts, tightening the drive belts and then retightening the clamps securing the drive belts.

According to one aspect of the present invention, the multi-axis gantry includes first and second guide tracks extending generally parallel to one another. A third guide track extends along a different axis than the first and second guide tracks. A first carriage and a roller guide are attached proximate opposite ends of the third track and engage the first and second guide tracks for movement relative thereto, respectively. A second carriage attached to the third track moves relative thereto. A first drive motor connected to both the first carriage and the roller guide simultaneously drives the first carriage and the roller guide in coordinated movement along the first and second guide tracks. A second drive motor is coupled to the second carriage by a second drive loop and drives the second carriage along the second axis.

In another aspect, the invention provides a multi-axis gantry comprising first and second tracks extending in generally parallel spaced apart relation along a first direction. A third track extends in a second direction transverse to the first direction and operably engages the first and second tracks for movement in the first direction along the first and second tracks. A first carrier supported by the third track is movable along the third track in the second direction. A first drive motor operably connects to and actuates the first carrier via a first drive loop. A second drive motor operably connects to the third track via a second drive loop. The second drive loop attaches to the third track proximate opposite ends such that the second drive motor actuates the third track by coordinated actuation of the opposite ends of third track relative to the first and second tracks in the first direction via the second drive loop.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
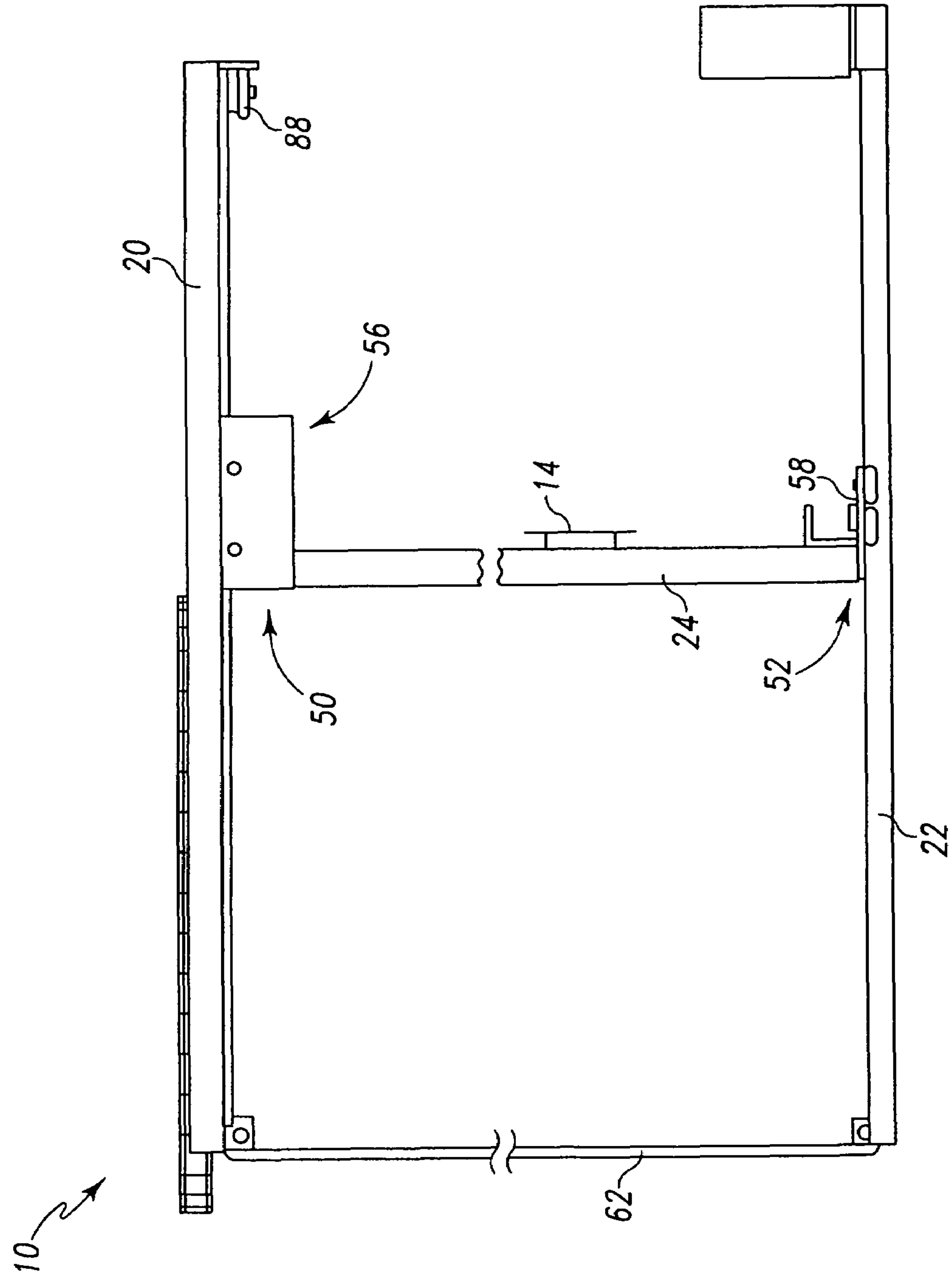
FIG. 1 is a front view of an exemplary embodiment of an xy-gantry in accordance with the teachings of the present invention.

Moving now to the figures, FIG. 1 illustrates an xy-gantry 10 according to the teachings of the present invention. The xy-gantry 10 provides for automated two dimensional positioning. More particularly, the xy-gantry 10 provides for automated two dimensional positioning and movement of a work piece carriage 14. The work piece carriage 14 is configured for carrying or supporting a work attachment (not shown) for performing a given function at a predetermined location or moving the work attachment along a predetermined path. For example, a magnet, hook, clamp, suction clamp or push rod may be attached to the work piece carriage 14 for selectively engaging an item for automated movement of the item. This is particularly useful when transporting or moving a selected item from one predetermined location to another predetermined location such as during product handling and distribution. Additionally, the xy-gantry 10 according to the teachings of the present invention can be used to accurately control the movement and location of such devices as pen plotters, laser cutters or other like devices that require accurate controlled movement of the work attachment while it is operating.

The illustrated embodiment of the xy-gantry 10 is configured for vertical (y-axis) and horizontal (x-axis) positioning of the work piece carriage 14. To facilitate the movement along the multiple axes, the xy-gantry 10 generally includes a plurality of cooperating tracks, including a top track 20, a bottom track 22, and a vertical track 24 as well as horizontal and vertical drive systems. The top and bottom tracks 20, 22 are vertically spaced apart in generally parallel relation to one another and function to guide positioning of the work piece carriage 14 parallel to the horizontal axis. The vertical track 24 extends vertically in substantially perpendicular relation between the top and bottom tracks 20, 22 and functions to guide positioning of the work piece carriage 14 parallel to the vertical axis. More specifically, the work piece carriage 14 is movingly mounted to the vertical track 24 and moves relative thereto for vertical positioning. To horizontally move and position the work piece carriage 14, the entire vertical track 24, including the work piece carriage 14 mounted thereto, moves horizontally (left-to-right or right-to-left with reference to FIG. 1) relative to the top and bottom tracks 20, 22. Thus, the work piece carriage 14 may be precisely positioned both vertically and horizontally by coordinated horizontal and vertical movement of the various components of the xy-gantry 10.

Although the present invention will be described with reference to an embodiment of an xy-gantry providing movement along horizontal and vertical axes, the present invention is not so limited to only vertical and horizontal movement. One of ordinary skill in the art will recognize that the xy-gantry according to the teachings of the present invention can be configured to provide movement along multiple axes such as in both vertical and horizontal planes.

In an embodiment, the top and bottom tracks 20, 22 are configured to be mounted to a vertical support structure such as a wall (not shown). One particular application would be mounting the top and bottom tracks 20, 22 to the walls of a vending machine (not shown) such that the xy-gantry 10 can be used to facilitate distribution of merchandise from within the vending machine. The top and bottom tracks 20, 22 may be mounted by any practical mounting means, including, but not limited to, rivets, nails, screws, bolts and the like. Alternatively, the top and bottom tracks 20, 22 could be welded or bonded to the vertical support structure, thereby, providing mounting means.

In a preferred embodiment, the top and bottom tracks 20, 22 are formed from sheet metal while the vertical track 24 is formed from extruded metal. As such, the top, bottom and vertical tracks 20-24 can be easily custom cut to any desired length. Furthermore, with the top and bottom tracks 20, 22 formed from sheet metal, the tracks 20, 22 are inexpensive to manufacture. While the above provides advantages, in alternative embodiments, the tracks 20-24 may be made from other materials or manufacturing processes.

Figure 2:
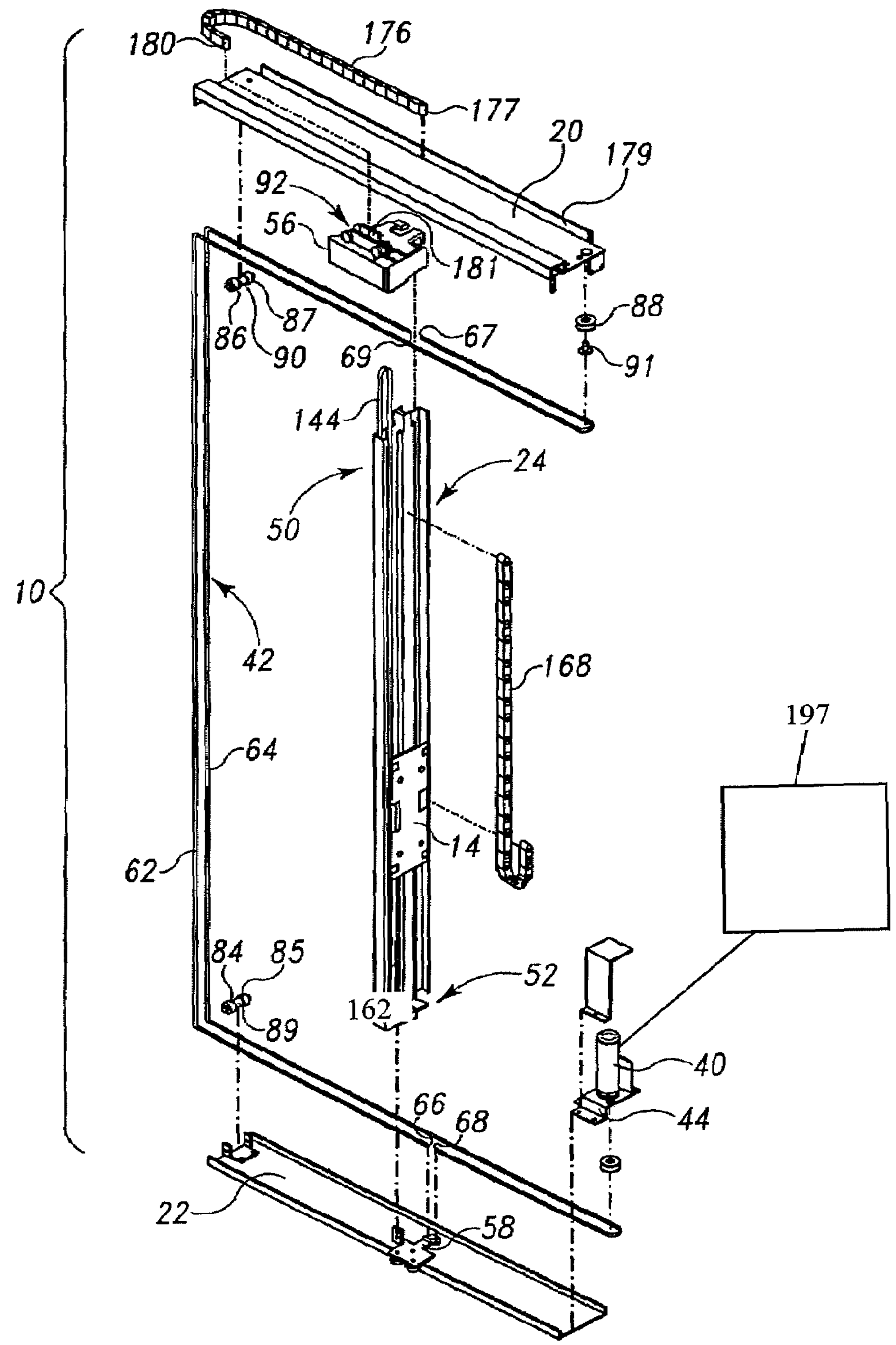
FIG. 2 is a partially exploded view of the xy-gantry of FIG. 1.
Figure 3:
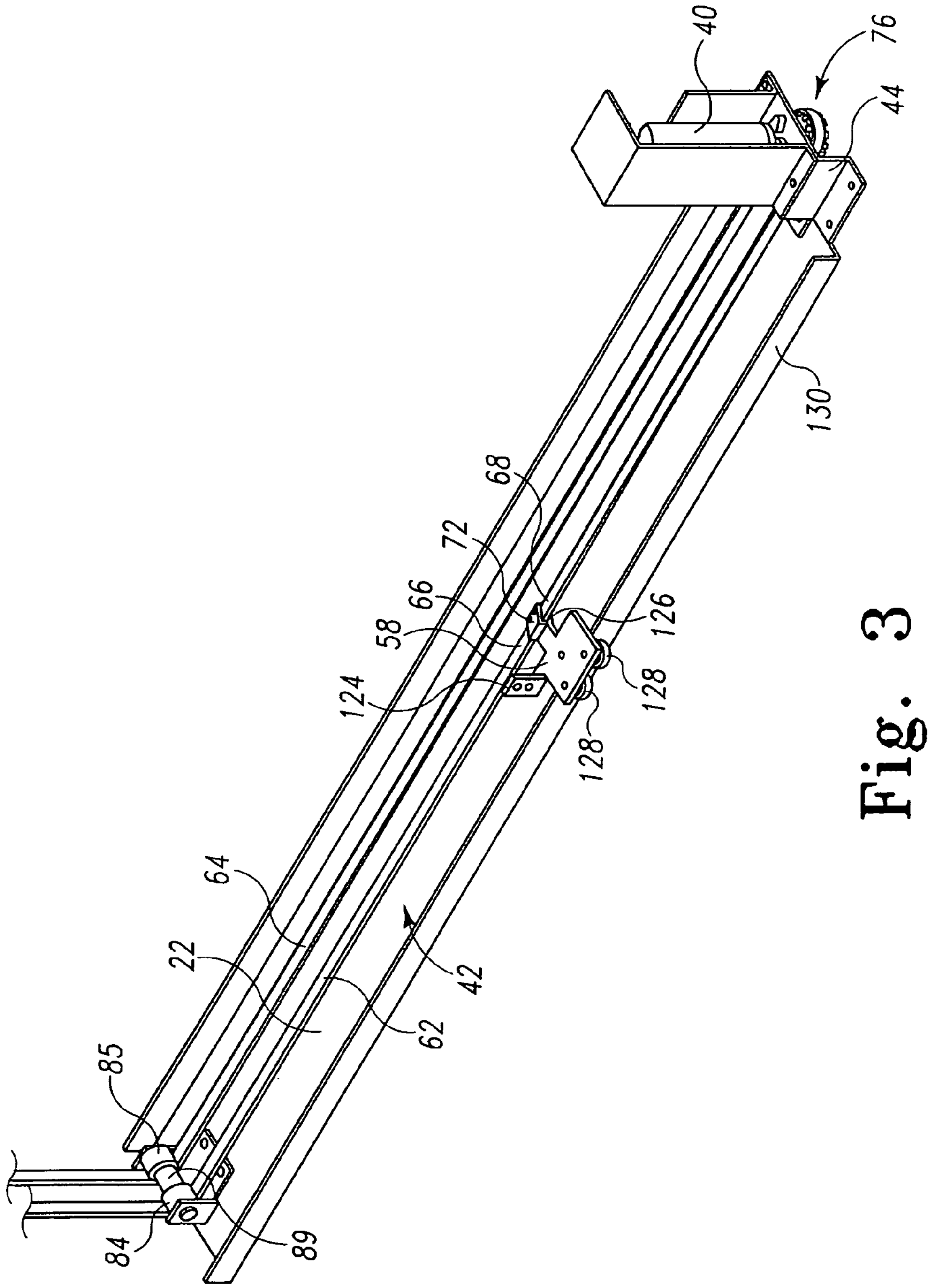
FIG. 3 is a partial exploded and perspective illustration of the bottom track of the xy-gantry of FIG. 1.

With further reference to FIGS. 2 and 3, the horizontal drive system of xy-gantry 10 generally includes a horizontal drive motor 40 and a drive belt system 42. The horizontal drive motor 40 mounts to a motor mount 44 fixed to the bottom track 22 and operably connects to and horizontally drives the vertical track 24. To prevent the vertical track 24 from cocking and binding during horizontal movement, the horizontal drive motor 40 is operably connected to and simultaneously horizontally drives both the top and the bottom ends 50, 52 of the vertical track 24.

More particularly, and with reference to FIGS. 1 and 2, a top carriage 56 and a bottom roller guide 58 connected to the top and bottom ends 50, 52 of the vertical track 24 guide the vertical track 24 for only horizontal movement along the top and bottom tracks 20, 22 respectively. In an embodiment, the top carriage 56 and bottom roller guide 58 are integrally formed in the vertical track 24 and are not separate components mounted to the vertical track 24. In the illustrated embodiment, the top carriage 56 mounts the vertical track 24 to the top track 20 and vertically carries the vertical track 24. The drive belt system 42 interconnects the top carriage 56 and the bottom roller guide 58 to coordinate simultaneous horizontal movement of the top and bottom ends 50, 52 of the vertical track 24. With the top carriage 56 and bottom roller guide 58 interconnected, the horizontal drive motor 40 simultaneously pulls both the top and bottom ends 50, 52 of the vertical track 24 when it actuates the drive belt system 42.

When the horizontal drive motor 40 drives the drive belt system 42 in one direction both the top carriage 56 and the bottom roller guide 58 are both actuated parallel to the horizontal axis in a first direction. When the horizontal drive motor 40 drives the drive belt system 42 in the opposite direction, both the top carriage 56 and the bottom roller guide 58 are actuated parallel to the horizontal axis in a second direction, opposite the first direction.

The horizontal drive motor 40 can be any suitable motor but is preferably a direct current stepper motor that includes an integral encoder. Furthermore, the motor preferably operates at between 20V and 35V DC with a running torque of 5 in-lbs with an output speed of between about 450 and 550 RPM at 0 in-lbs of torque and between about 350 and 450 RPM at 5 in-lbs of torque. Alternatively, the encoder could be an independent component separate from the horizontal drive motor 40. As illustrated in FIG. 2, the horizorital drive motor 40 and the integral encoder operably communicate with a controller 197 for accurate control and positioning of the vertical track 24.

The horizontal drive belt system 42 is provided by a pair of timing belt segments 62, 64 that include pairs of distal ends 66, 67 and 68, 69, respectively. With general reference to FIGS. 2-4, each timing belt segments 62, 64 has one of its distal ends 67, 69 attached to the main frame 98 of the top carriage 56 and the opposite distal ends 66, 68 attached to the bottom roller guide 58, respectively. Belt clamps 72 (see FIGS. 3 and 4) attach the distal ends 66-69 of the timing belt segments 62, 64 to the top carriage 56 and bottom roller guide 58. By incorporating timing belt segments rather than an endless timing belt loop, the tension of the drive belt system 42 can be adjusted without requiring a separate idler pulley. Additionally, the length of the timing belt segments 62, 64 can be easily custom cut for manufacture of custom sized xy-gantries without having to create endless timing belts of irregular lengths. This simple configuration decreases the complexity of manufacture and cost of custom xy-gantries. However, an embodiment of the present invention can use endless timing belts or timing belts that provide a continuous loop.

Figure 4:
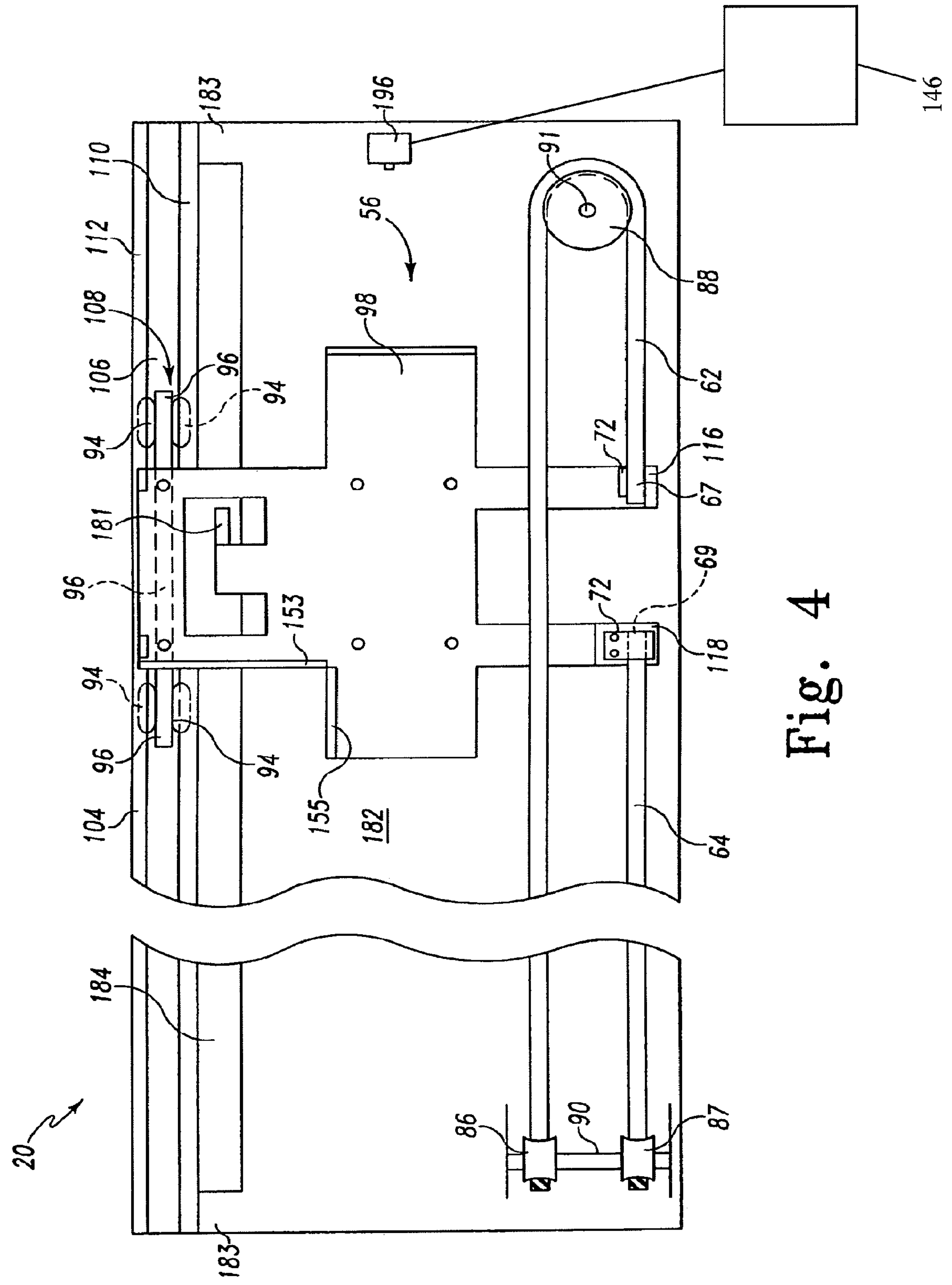
FIG. 4 is bottom plan view of the top track of the xy-gantry of FIG. 1.

Although the illustrated embodiment uses timing belt segments 62, 64, with further reference to FIGS. 2-4, the drive belt system 42 forms a substantially continuous or endless drive loop when both timing belt segments 62, 64 are secured to the top carriage 56 and bottom roller guide 58. The drive belt system 42, particularly timing belt segment 64, wraps around and engages a drive sprocket 76 mounted on a drive shaft of the horizontal drive motor 40. It is preferable, but not required, that the drive sprocket 76 includes teeth or grooves sized to receive and engage teeth of the timing belt segments 62, 64 to prevent slippage. The timing belt used for the timing belt segments 62, 64 is preferably an elastomeric or rubber-like material that is flexible such that it can easily and resiliently bend. However, preferably, the material has limited elasticity along its length such that stretching is limited. Timing belt materials may include neoprene, polyurethane, rubber and other rubber like material. Furthermore, the timing belts may be reinforced to reduce the amount of linear stretching by materials such as fiberglass, Kevlar, polyester, steel, and other known reinforcing materials. Additionally, it is not required that the drive belt system 42 be formed from a timing belt. Other similar means that can be easily bent but have limited stretching can be used such as chain, rope, cord, metal tape, composite belts and the like.

The xy-gantry 10 includes a drive belt guide system that guides the movement of the drive belt system 42 during actuation of the vertical track 24. For explanative purposes, the timing belt system 42 will be explained as defining a front portion and a back portion. The drive sprocket 76 (FIG. 3) and a large idler pulley 88 (FIG. 4) positioned at proximate ends of the bottom and top tracks 22, 20, respectively, divide the timing belt system 42 into the front portion and the back portion. It will be realized that the front and back portions are formed by portions of both timing belt segments 62, 64. Furthermore, because of the looped configuration, when the horizontal drive motor 40 drives the timing belt system 42 to move the vertical track 24, a given segment of the front portion of the timing belt system 42 moves in the opposite direction as a corresponding proximate segment of the rear portion of the timing belt system 42.

The drive belt guide system includes the drive sprocket 76 attached to the horizontal drive motor 40 and a plurality of pulleys 84-88. All pulleys can include teeth as explained previously. With reference to FIG. 3, at a first end of the bottom track 22, the timing belt system wraps around the drive sprocket 76 of the horizontal motor 40. At the opposite end of the bottom track 22, a pair of pulleys 84, 85 mount on an idler shaft 89 in the form of a clevis pin. The pulleys 84, 85 are spaced apart from the bottom track 22 such that both timing belt segments 62, 64 pass between the pulleys 84, 85 and the bottom track 22. Particularly, one segment 62 aligns with and engages the first pulley 84, while the other segment 64 aligns with and engages the second pulley 85. The fixed position and rigid attachment of the pulleys 84, 85 to the bottom track 22 allows the timing belt segments 62, 64 to bend vertically upward toward the top track 20, as best illustrated in FIG. 2.

Referring to FIG. 4, the top track 20 includes a second pair of pulleys 86, 87 mounted on a second idler shaft 90. The timing belt system 42 passes between the pulleys 86, 87 and the top track 20. One segment 62 of the timing belt system 42 passes over one of the idler pulleys 86 while the other segment 64 passes over the other idler pulley 87. These idler pulleys 86, 87 are rigidly fixed to the top track 20 and similarly allow the belt drive segments 62, 64 to flex and bend to change direction such that the segments 62, 64 extend horizontally between the ends of the top track 20. At the opposite end of the top track 20, the drive belt wraps around the large idler pulley 88 mounted to a clevis pin 91 that has an axis of rotation generally perpendicular to the top track 20.

Figure 5:
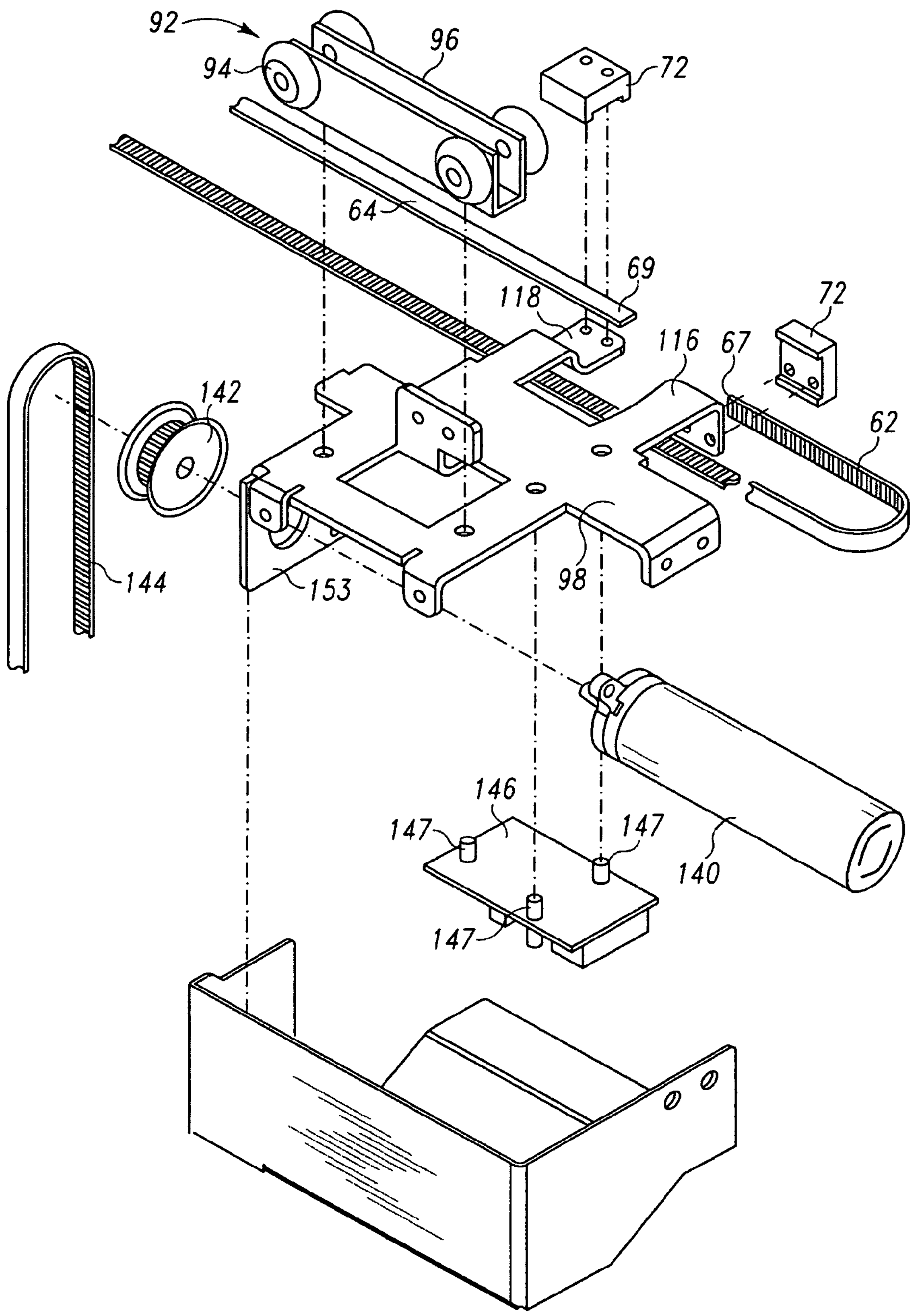
FIG. 5 is an exploded illustration of the top carriage of the xy-gantry of FIG. 1.

As illustrated in FIGS. 2, 4 and 5, the top carriage 56 includes a roller assembly 92 that mounts the top carriage 56 to the top track 20. The roller assembly 92 is configured to allow the top carriage 56 to move horizontally along the top track 20. More particularly, the roller assembly 92 includes a plurality of rollers 94 mounted to a base member 96. The illustrated roller assembly 92 includes two pairs of rollers 94 on opposed sides of the base member 96. The base member 96 connects the roller assembly 92 to the main frame 98 of the top carriage 56.

The top track 20 includes a mounting track portion 104 having an elongated cavity 106 that substantially receives the roller assembly 92 to guide the horizontal movement of the top carriage 56. The bottom of the mounting track portion 104 includes a channel 108 that extends the length of the mounting track portion 104 that provides access to the cavity 106. The channel 108 is interposed between two roller support flanges 110, 112 that further provide the bottom of the mounting track portion 104. The roller support flanges 110, 112 extend inward toward each other from sidewalls of the mounting track portion 104. In an embodiment, the roller support flanges 110, 112 are canted relative to the sidewalls.

The roller assembly 92 inserts into the cavity 106 of the mounting track portion 104 with the rollers 94 positioned within the cavity 106 and rollably vertically supported by the roller support flanges 110, 112. The base member 96 extends outward from the cavity 106 through the channel 108 in the bottom of the mounting track portion 104 such that it is interposed between the two roller support flanges 110, 112. The channel 106 provides a free path for the base member 96 to travel the length of the mounting track portion 104 while being connected to both the top carriage 56 that is exterior of the mounting track portion 104 and the rollers 94 positioned within the cavity 106. Although the channel 108 is illustrated in the bottom of the mounting track portion 104 of the illustrated embodiment, the channel 106 can be formed in the top or the sides of the mounting track portion 104 depending on the embodiment of the xy-gantry such as whether the xy-gantry substantially provides movement in a vertical plane or a horizontal plane.

The top carriage 56 further includes a pair of timing belt mounts 116, 118 to which the distal ends 67, 69 of the drive belt system are clamped by the belt clamps 72. In the illustrated embodiment, the top carriage 56 is attached to the back portion (as viewed in FIG. 2) of the drive belt system 42. The main frame 98 of the top carriage 56 further includes a mounting flange 155 that mounts the top carriage 56 to the vertical track 24.

Referring to FIGS. 2 and 3, the bottom roller guide 58 includes a mounting flange 124 to attach the bottom roller guide 58 to the bottom end 52 of the vertical track 24. The bottom roller guide 58 includes a belt attachment flange 126 to which a distal end 66, 68 of each timing belt length 62, 64 are secured. While the top carriage 56 is attached to the back portion of the timing belt system, the bottom roller guide 58 is attached to the front portion of the timing belt system. As will be recognized by one of ordinary skill in the art, this configuration allows the single drive loop configuration to simultaneously drive the top carriage 56 and bottom roller guide 58 in the same horizontal direction.

Figure 6:
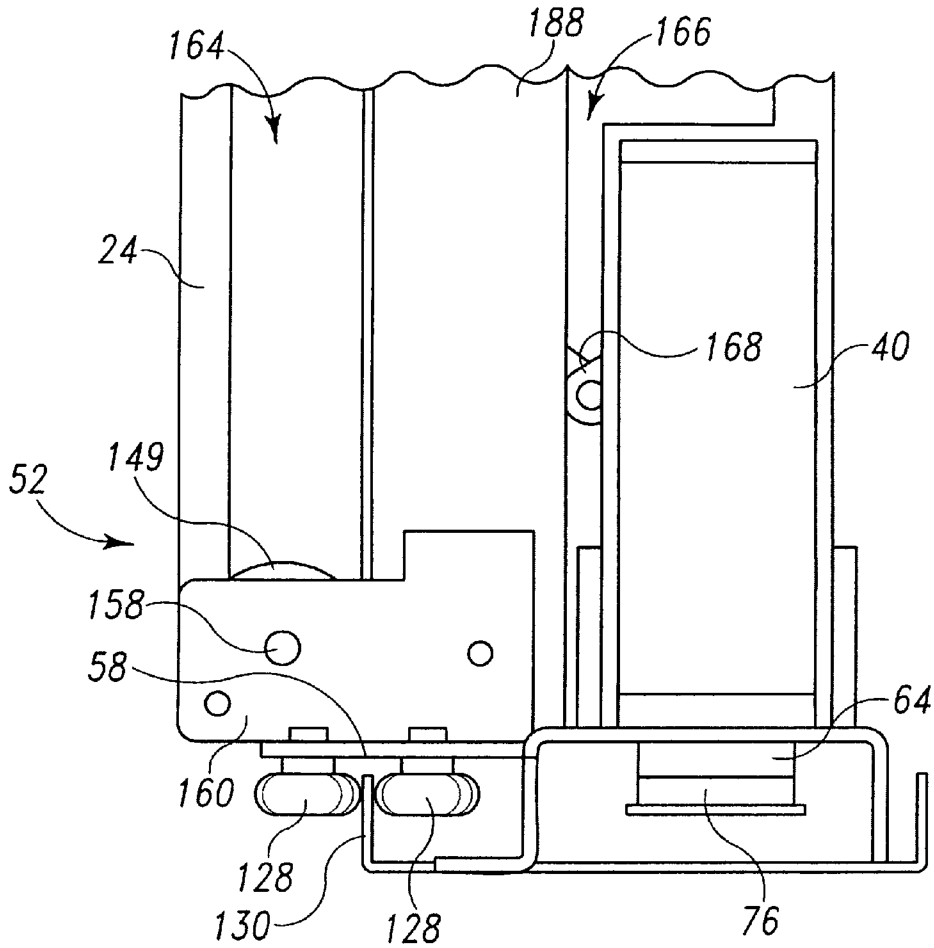
FIG. 6 is a partial side view of the xy-gantry of FIG. 1 illustrating the roller guide and lower pulley for the drive loop connected to the work piece carriage.

The bottom roller guide 58 includes three guide rollers 128. However, any number of rollers may be used. As best illustrated in FIG. 6, the rollers 128 are spaced apart such that a guide rail portion 130 of the bottom track 22 that extends vertically upward passes between the rollers 128. Particularly, two rollers 128 are positioned in rolling contact with an outer surface of the guide rail portion 130 and one roller 128 is positioned in rolling contact with an inner surface of the guide rail portion 130. With the xy-gantry 10 assembled and the rollers 128 positioned on both sides of the guide rail portion 130, the bottom roller guide 58 and, consequently, the bottom end 52 of the vertical track 24 can only move horizontally along the length of the guide rail portion 130.

In an embodiment, the bottom track 22 does not provide substantial vertical support for the vertical track 24, other than minor frictional forces between the rollers 128 and the guide rail portion 130, in the illustrated embodiment. The top track 20, namely the mounting track portion 104, vertically supports the vertical track 24. Furthermore, because the guide rail portion 130 merely slides between the rollers 128, the bottom track 22 is not rigidly connected to the top track 20 via the vertical track 24. Specifically, if the bottom track 22 were not mounted to a vertical support, the bottom track 22 would merely fall vertically and the guide rail portion 130 would slide right out of engagement with the rollers 128.

However, in an embodiment, the bottom roller guide 58 is vertically supported by the bottom track 22. In such a configuration, the bottom roller guide would include at least one roller positioned to support the vertical loading. Alternatively, if the xy-gantry 10 were positioned for movement in a horizontal plane the rollers 128 would provide vertical support for that end of the vertical track 24.

As illustrated in the exploded view of FIG. 5, a second drive motor, a vertical drive motor 140, is carried by the top carriage 56. The vertical drive motor 140 operably drives the work piece carriage 14 relative to the vertical track 24 in a vertical direction. A drive sprocket 142 attached to an output shaft of the vertical drive motor 140 engages a third length of timing belt 144 that operably connects the vertical drive motor 140 to the work piece carriage 14 (see FIG. 7). The main frame 98 of the top carriage 58 includes a motor support flange 153 to which the vertical drive motor 140 mounts.

The timing belt length 144 may include teeth and the drive sprocket 142 may include corresponding teeth for engaging the teeth of the timing belt length 144. The vertical drive motor 140 can be any suitable motor but is preferably a direct current stepper motor that includes an integral encoder and is preferably similar to the horizontal drive motor 40. Alternatively, the encoder could be independent from the drive motor 140. The vertical drive motor 140 and corresponding encoder operably communicate with a controller 146 for accurate control and positioning of the work piece carriage 14.

The controller 146 may be an integrated circuit including any one of or any combination of a processor a central processing unit, an input/output interface, timers, RAM for data storage and other electrical components to control actuation of the stepper motor. The controller 146 mounts to the main frame 98 of the top carriage 56 and includes a plurality of standoffs 147 that insert into a plurality of corresponding holes in the main frame 98 to secure the controller 146 to the main frame 98. The combination of the stepper motor, the timing belt, the encoder and the circuit board allows for precise and accurate vertical positioning of the working piece carriage 14.

With reference to FIGS. 2 and 5-7 the vertical timing belt 144 forms a second drive loop and wraps around the drive sprocket 142 connected to the vertical drive motor 140 as well as an idler pulley 149 positioned proximate the bottom end 52 of the vertical track 24. In an embodiment, the timing belt 144 is not an endless loop, but is a length of timing belt having distal ends 150 similar to the segments 62, 64 of the previously discussed horizontal timing belt system 42. In this configuration, the distal ends 150 are attached to the working piece carriage 14 by belt clamps 72 (see FIG. 7). The belt clamps 72 pinch the timing belt 144 between themselves and a belt mounting flange 154 of the work piece carriage 14. As previously discussed, this configuration further promotes calibration and easy custom construction.

Figure 7:
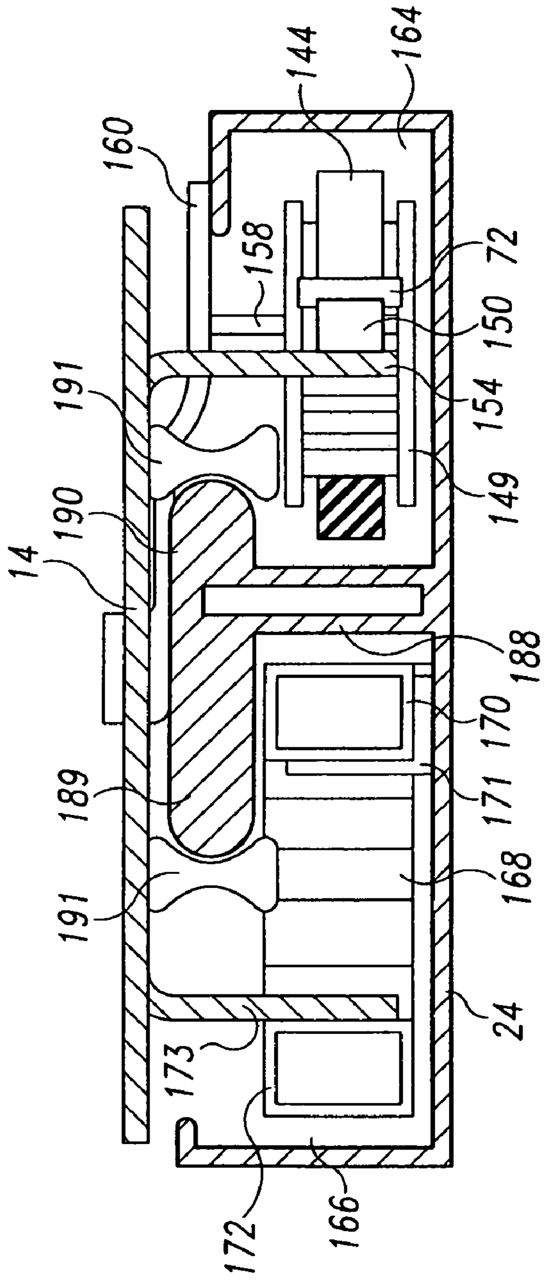
FIG. 7 is a cross-sectional illustration of the vertical track of the xy-gantry of FIG. 1.

An idler shaft 158 mounts to a mounting bracket 160 and secures the idler pulley 149 to the bottom end of the vertical track 24 (see FIGS. 6 and 7). The idler pulley 149 is positioned within a belt guide channel 164 formed in and extending the length of the vertical track 24. The belt guide channel 164 has a substantially C-shaped cross-section and acts to guide and protect the drive belt 144 as it moves relative to the vertical track 24.

Parallel to the belt guide channel 164 is a cable carrier channel 166 that houses a cable carrier 168. The cable carrier channel 166 has a substantially C-shaped cross-section. The cable carrier 168 protects any cables (not shown) for controlling any attachments mounted to the work piece carriage 14. A first free end 170 of the cable carrier 168 is fixed to a cable carrier guide 171 mounted within the cable carrier channel 166. The second free end 172 of the cable carrier 166 is fixed to the cable carrier mount 173 of the work piece carriage 14. Further, the cable carrier 168 tracks the movement of the work piece carriage 14 and protects any cables from becoming damaged, snagged, or pinched as is generally known in the art.

The work piece carriage 14 mounts to a center guide track 188 of the vertical track 24 for vertical movement relative thereto. The center guide track 188 substantially separates the belt guide channel 164 from the cable carrier channel 166. The center guide track 188 has a T-shaped cross-section that provides two roller tracks 189, 190 that are formed by a pair of cantilever flanges that extend away from one another.

The work piece carriage 14 includes a plurality of concave rollers 191 that are laterally spaced apart and mount the work piece carriage 14 to the roller tracks 189, 190. The concave rollers 191 engage and ride on the roller tracks 189, 190. The concave profile of the rollers 191 allows the work piece carriage 14 to only move in the vertical direction and prevents the rollers 191 and, consequently, the work piece carriage 14 from disengaging the vertical track 24. Alternatively, the rollers 191 could be replaced by low friction slides, such as slides formed from or coated with polytetrafluoroethylene, commercially known as Teflon.

Another cable carrier 176 mounts to the top track 20. The cable carrier 176 has a first free end 177 fixed to a cable carrier support flange 179 of the top track 20. The cable carrier support flange 179 is a portion of the top track 20 that extends vertically upward. The second free end 180 of the cable carrier 176 is fixed to a cable carrier mounting flange 181 of the main frame member 98 of the top carriage 56. As such, the cable carrier 176 tracks the horizontal movement of the top carriage 56. This cable carrier 176 protects the wires (not shown) that are connected to the vertical drive motor 140 and its corresponding controller 146.

As can be best understood with reference to FIG. 4 the mounting track portion 104 of the top track 20 is spaced apart from a main panel 182 of the top track 20 by standoffs 183 integrally formed in the main panel 182 forming a gap 184, therebetween. When assembled, the cable carrier mounting flange 181 of the top carriage 56 extends into the gap 184 and vertically beyond the top surface of the main panel 182. Furthermore, any cables that pass through the cable carrier 176 to the vertical drive motor 140 or controller 146 similarly pass through the gap 184 between the mounting track portion 104 and the main panel 182.

The xy-gantry 10 may include a plurality of limit switches (not shown) to control the maximum travel of the vertical track 24 and work piece carriage 14. When the vertical track 24 is actuated to either end of the top and bottom tracks 20, 22, horizontal limit switches, such as limit switch 196 of FIG. 4, may be actuated to prevent the vertical track 24 from running into the pulleys of the top and bottom tracks 20, 22, which could cause damage to the drive belt system 42 or the tracks 20-24. Similarly, vertical limit switches can limit the maximum vertical travel of the work piece carriage 14 to prevent damage to the work piece carriage 14 or the drive belt 144 that controls its vertical movement.

The limit switches can also be used on activation of the xy-gantry 10 to determine an initial position of the vertical track 24 and the work piece carriage 14. For example, when the xy-gantry 10 is first activated or energized, the vertical track 24 and work piece carriage 14 can be actuated until they each activate a corresponding limit switch. At the point of actuation, the controller 146 and encoder can establish a point of reference from which the controller 146 and encoder combination can accurately position the respective components.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-axis gantry comprising:

first and second spaced apart tracks, the first and second tracks extending in generally parallel relation to one another and a first axis;

a third track extending along a second axis different than the first axis;

a first carriage and a roller guide attached proximate opposite ends of the third track, the first carriage and the roller guide movable along the first and second tracks, respectively for movement along the first axis;

a second carriage attached to the third track for movement about the third track along the second axis;

a first drive motor operably connected to the first carriage and the roller guide to simultaneously drive the first carriage and the roller guide in coordinated movement parallel to the first axis by a first drive loop operably interconnecting the first carriage, the roller guide and the first drive motor; and a second drive motor operably coupled to the second carriage by a second drive loop to operably drive the second carriage generally along the second axis, the second drive motor being mounted for coordinated movement relative to the first and second tracks along the first axis with the first carriage and roller guide when the first drive motor drives the first carriage and the roller guide in coordiniated movement parallel to the first axis.

2. The multi-axis gantry of claim 1, further comprising at least one electronic controller and wherein the first and second drive motors include integral encoders, the integral encoders being in operable communication with the at least one electronic controller, the at least one electronic controller configured to process information from the encoders, and to activate and deactivate the first drive motor to position the first carriage and the roller guide relative to the first and second tracks, respectively, via the first drive loop, and selectively activate and deactivate the second drive motor to position the second carriage relative to the third track via the second drive loop.

3. The multiple-axis gantry of claim 2 further comprising at least one first axis limit switch and at least one second axis limit switch, wherein when the at least one first axis limit switch is actuated by movement of one of the first carriage, third track or roller guide, the at least one controller determines a first axis reference point for positioning the second carriage along the first axis and when the at least one second axis limit switch is actuated by movement of the second carriage the at least one controller determines a second axis reference point for positioning the second carriage along the second axis.

4. The multi-axis gantry of claim 1, wherein the first and second tracks are formed sheet metal components and the third track is a metal extrusion.

5. The multi-axis gantry of claim 1, wherein the first and second tracks are configured to be mounted to a support, the second track spaced apart from the first track in a direction along the second axis, third track supported in a direction along the second axis by the first track and substantially free from support along the second axis by the second track.

6. The multiple-axis gantry of claim 5, wherein the first track includes a mounting track portion including an elongated cavity elongated along the first axis, the mounting track portion including an elongated opening formed therein extending substantially the entire length of the cavity, the first carriage including a first plurality of rollers mounted to a base member, the base member extending into the cavity via the elongated opening such that the first plurality of rollers are positioned within the cavity, the mounting track portion supporting the first plurality rollers in a direction along the second axis and the third track via the rollers, the first plurality of rollers in combination with mounting track portion preventing movement by the first carriage substantially parallel to a third axis extending perpendicular relative to the first and second axes.

7. The multiple axis gantry of claim 6, wherein the elongated opening is formed between a pair of flanges that extend toward each from sidewalls of the mounting track portion.

8. The multiple-axis gantry of claim 6, wherein the first carriage and the roller guide are substantially integral with the third track.

9. The multiple-axis gantry of claim 6, wherein the second track includes a guide track, the roller guide including a second plurality of rollers, the guide track configured to engage the second plurality of rollers to prevent movement by the roller guide substantially parallel to the third axis.

10. The multiple axis gantry of claim 9, wherein the guide track includes a flange extending along the second axis, the second plurality of rollers spaced apart defining a gap receiving the guide track flange therein for rolling engagement along the first axis.

11. A multi-axis gantry comprising:

first and second spaced apart tracks, the first and second tracks extending in generally parallel relation to one another and a first axis;

a third track extending along a second axis different than the first axis;

a first carriage and a roller guide attached proximate opposite ends of the third track, the first carriage and the roller guide movable along the first and second tracks, respectively for movement long the first axis;

a second carriage attached to the third track for movement about the third track along the second axis;

a first drive motor operably connected to the first carriage and the roller guide to simultaneously drive the first carriage and the roller guide in coordinated movement parallel to the first axis by a first drive loop operably interconnecting the first carriage, the roller guide and the first drive motor;

a second drive motor operably coupled to the second carriage by a second drive loop to operably drive the second carriage generally along the second axis; and wherein the first drive loop includes two drive loop segments wherein a first end of each drive loop segment is connected to the first carriage and a second opposite end of each drive loop segment is connected to the roller guide thereby defining a continuous drive loop and the second drive loop is defined by a third drive loop segment, the third drive loop segment having third and fourth opposite ends secured to the second carriage.

12. The multi-axis gantry of claim 11, wherein the first drive motor includes a first drive sprocket that directly engages the first drive loop and the second drive motor includes a second drive sprocket that directly engages the second drive loop.

13. The multi-axis gantry of claim 12, wherein the drive loop segments are timing belt segments that include teeth formed therein, the first drive sprocket and second drive sprocket include corresponding teeth configured to engage the teeth of the timing belt.

14. A multi-axis gantry comprising:

first and second tracks extending in generally parallel spaced apart relation in a first direction;

a third track extending in a second direction generally transverse to the first direction, the third track engaging, the first and second tracks and movable in the first direction along the first and second tracks;

a first carrier along with a first drive loop supported by the third track and movable along the third track in the second direction;

the first drive motor operably connected to the first carrier with a first drive loop for actuating the first carrier; and a second drive motor operably connected to the third track with a second drive loop, the second drive loop attached to the third track proximate opposite ends of the third track, the second drive motor operable to simultaneously actuate the opposite ends of the third track relative to the first and second tracks in the first direction via the second drive loop; and wherein the first and second tracks are formed from independent pieces such that the first and second tracks are independently mountable to a support irrespective of the mounting of the other one of the tracks to the support.

15. The multi-axis gantry of claim 14, wherein the first and second tracks are not rigidly connected along the second direction by the third track.

16. The multi-axis gantry of claim 14, further comprising at least one electronic controller and wherein the first and second drive motors include integral encoders in operable communication with the at least one electronic controller, the at least one electronic controller configured to process information from the encoders, and to selectively activate and deactivate the first drive motor to position the third track in the first direction, and to selectively activate and deactivate the second drive motor to position the first carriage in the second direction, further comprising at least one first axis limit switch and at least one second axis limit switch, the limit switches in operable communication with the electronic controller, wherein actuation of the at least one first axis limit switch determines a first direction reference location and actuation of the at least one second axis limit switch establishes a second direction reference location.

17. The multi-axis gantry of claim 14, wherein the second track includes a mounting track portion including an elongated cavity elongated along the first direction, the mounting track portion including an elongated opening formed therein extending substantially the entire length of the cavity, the third track including a first plurality of rollers proximate the first end, the first plurality of rollers positioned within the cavity, the mounting track portion supporting the third track in the second direction via the first plurality of rollers, the first plurality of rollers in combination with mounting track portion preventing movement by the first carriage substantially parallel to a third direction extending in perpendicular relation to the first and second axes, the second track further including a guide track, the second end of the third track including a second plurality of rollers configured to engage the guide track to prevent movement of the third track in the third direction.

18. A. multi-axis gantry comprising:

first and second tracks extending in generally parallel spaced apart relation in a first direction;

a third track extending in a second direction generally transverse to the first direction, the third track engaging, the first and second tracks and movable in the first direction along the first and second tracks;

a first carrier supported by the third track and movable along the third track in the second direction;

a first drive motor operably connected to the first carrier with a first drive loop for actuating the first carrier; and a second drive motor operably connected to the third track with a second drive loop, the second drive loop attached to the third track proximate opposite ends of the third track the second drive motor operable to simultaneously actuate the opposite ends of the third track relative to the first and second tracks in the first direction via the second drive loop; and wherein the first drive loop includes two drive loop segments wherein a first end of each drive loop segment is operably connected proximate to a first end of the third track, and a second opposite end of each drive loop segment is operably connected proximate to a second opposite end of the third track thereby defining a continuous drive loop and the second drive loop is defined by a third drive loop segment, third drive loop segment having third and fourth opposite ends secured to the second carriage.

19. The multi-axis gantry of claim 18, wherein the first drive motor includes a first drive sprocket that directly engages the first drive loop and the second drive motor includes a second drive sprocket that directly engages the second drive loop.

20. The multi-axis gantry of claim 19, wherein the drive loop segments are timing belt segments that include teeth formed therein, the first drive sprocket and second drive sprocket include corresponding teeth configured to engage the teeth of the timing belt.

* * * * *